United States Patent [19]

Berkowitz

[11] 4,328,503

[45] May 4, 1982

[54] HIGH RESOLUTION MAGNETIC PRINTING HEAD

[75] Inventor: Ami E. Berkowitz, Schenectady, N.Y.

[73] Assignee: General Electric Company, Schenectady, N.Y.

[21] Appl. No.: 90,359

[22] Filed: Nov. 1, 1979

[51] Int. Cl.[3] .............................................. G01D 15/12

[52] U.S. Cl. .................................... 346/74.5; 360/125; 101/113

[58] Field of Search ............... 346/74.1; 360/125, 126, 360/127; 101/113, 90

[56] References Cited

U.S. PATENT DOCUMENTS

| | | | |
|---|---|---|---|
| 3,254,626 | 6/1966 | Uemura | 346/74.1 |
| 3,634,632 | 1/1972 | Watson | 360/125 |
| 4,025,927 | 5/1977 | Nelson | 346/74.1 |
| 4,097,871 | 6/1978 | Berkowitz et al. | 346/74.1 |
| 4,176,362 | 11/1979 | Nelson | 346/74.1 |

*Primary Examiner*—Glen R. Swann, III

*Attorney, Agent, or Firm*—Alexander M. Gerasimow; James C. Davis, Jr.; Marvin Snyder

[57] ABSTRACT

A high resolution magnetic printing head comprises a pair of interlaced printed circuit board structures. Each printed circuit board structure comprises a two or three layer assembly in which each layer comprises a flexible printed circuit board having an elongated gap therein with electrically conductive signal lines crossing the gap. On each three layered structure, the signal lines on adjacent circuit boards are substantially parallel where the lines cross the gaps in the printed circuit boards. The two printed circuit board structures are adjacently disposed so that their respective elongated gaps are aligned but so that the conductive signal lines are interlaced. High permeability magnetic material is then deposited between said interleaved signal lines by electrodeposition so as to form magnetic pole pieces between the conductors bridging the elongated gaps.

6 Claims, 3 Drawing Figures

HIGH RESOLUTION MAGNETIC PRINTING HEAD

BACKGROUND OF THE INVENTION

This invention relates to magnetic printing heads and in particular to high resolution magnetic printing heads in which the magnetic pole pieces are formed by electrodeposition.

A detailed description of magnetic printing is found in U.S. Pat. No. 4,097,871 issued to Berkowitz et al, said patent being assigned to the same assignee as herein, and the inventor herein being the same as one of the inventors in the aforementioned patent. It is to be particularly noted that the magnetic printing head described herein is a transverse magnetic printing head. That is to say, the direction of orientation of the magnetic field impressed on the recording medium is perpendicular to the direction of movement of the medium.

Magnetic printing basically involves the transfer of a dry magnetic ink image from a ferromagnetic recording medium to a permanent paper medium. A magnetic printing head selectively magnetizes regions of the ferromagnetic recording medium which, thereafter, attracts the magnetic ink. The ink is transferred to the recording medium by a magnetic ink brush thereby forming an image on the recording medium representative of the data desired to be transferred to the paper. The ink pattern on the recording medium is transferred to the paper medium on which the pattern is permanently fixed. The pattern on the magnetic recording medium is subsequently erased prior to the recording of new information thereon. The recording medium typically comprises a wide, flat belt having substantially the same width as the paper. The belt typically comprises a material similar to magnetic recording tape.

Magnetic printing offers several advantages over conventional printing methods. In particular, it is both rapid and relatively quiet. For example, magnetic printers are capable of printing speeds in excess of 6,000 lines per minute. Heretofore, however, the resolution attainable with magnetic printing has been limited to approximately 120 dots per inch. However, to achieve a print quality comparable to that of conventionally typewritten material, it is necessary to increase the resolution to 200 dots per inch (dpi) or more.

U.S. patent application Ser. No. 193,398, filed Oct. 2, 1980 (continuation-in-part of Ser. No. 060,921, filed July 26, 1979, now abandoned) describes a transverse magnetic head employing a long, comb-like structure, the teeth of which are oriented in a direction perpendicular to the direction of travel of the magnetic recording medium. This application is also assigned to the same assignee as the present invention and the inventor herein is one of the inventors in said application. The comb is composed of a material of high magnetic permeability so as to concentrate lines of magnetic flux at the tips of the comb teeth. A plurality of current carrying conductors is disposed through each of the gaps between the comb teeth and the current in these conductors controls the level of magnetic flux between the tips of adjacent comb teeth. The regions of magnetic flux, being in a position near to the magnetic recording medium, permit the selective magnetization of regions in the medium which regions thereafter attract magnetic ink. To achieve high resolution, the teeth of the comb must be spaced relatively close together. For example, if the teeth of the comb are spaced to form approximately 120 dots per inch, there is only a four mil spacing between adjacent teeth. Because of the small dimensions and the spacings involved, it does not appear practical to increase the resolution of the printing head simply by shrinking the spacing between the comb teeth.

There are several reasons for this practical limitation. First, even if the comb teeth could be more closely spaced, it becomes increasingly difficult to insert a magnetic comb with such fine teeth into a printed circuit board having equally finely spaced conductors for disposition between the comb teeth. Second, it becomes increasingly expensive to produce printed circuit boards having conductive pattern spacings of 200 lines per inch crossing an elongated gap in the printed circuit board as described in the aforementioned application, Ser. No. 060,921. Third, with decreased signal line dimensions, the resistance of the lines increases since they are significantly narrower. Accordingly, the line resistance is approximately doubled. This means that higher voltage circuit drivers are required, further increasing the cost of the printer. Fourth, by simply shrinking the dimensions, the dissipated power increases, thereby producing a potential heat problem particularly where the magnetic printing head contacts the recording medium. Dissipated power is also increased because of the greater duty cycle required in a 200 dot per inch magnetic printing head. However, in spite of the problems associated with increasing the resolution of the magnetic printing head disclosed in the abovementioned application Ser. No. 060,921, the teachings of this application, particularly those teachings related to digit line and word line patterns, are relevant to the present invention and therefore this application is incorporated herein by reference.

In U.S. Pat. No. 4,291,314, issued Sept. 22, 1981, to Nathan et al. and assigned to the same assignee as the present invention, the problems associated with inserting the high permeability magnetic comb structure in the printed circuit board assembly are obviated by the employment of electrodeposition methods to deposit high permeability magnetic material in the gaps between the signal conductors by electrodeposition. The electrodeposition of the magnetic material obviates the necessity of attempting to insert the comb into the printed circuit board without bending wires or breaking comb teeth because of the fragility of the parts occasioned by the requisite small dimensions. While the teachings of this invention avoid the problems of comb insertion, the problems of circuit cost and heat dissipation are nonetheless still present for printing heads having a resolution of 200 lines per inch or higher. Nonetheless, the above-noted U.S. Pat. No. 4,291,314 is relevant to the present invention with respect to its teachings concerning electrodeposition of the high permeability magnetic comb structure. Accordingly, U.S. Pat. No. 4,291,314 is incorporated herein by reference.

SUMMARY OF THE INVENTION

In accordance with a preferred embodiment of the present invention, a pair of printed circuit substrates each possesses an elongated gap across which conductive signal lines pass. These bridging conductors on each printed circuit board structure are interlaced so as to double the print resolution. Each of these structures preferably comprises three flexible printed circuit board layers. Each of these layers possesses an elongated gap across which electrically conductive signal lines cross, said signal lines being substantially parallel to one another in the vicinity of the elongated gap in the flexible printed circuit board. The flexible printed circuit boards in each of the two intermediate structures are disposed adjacent to one another so that said signal conductors on one board are aligned so as to be substantially parallel to the signal lines on the adjacent boards. The printed circuit board conductors themselves have a generally rectangular cross section. In each layered assembly the three vertically adjacent conductors define spaces therebetween which are preferably filled with an insulative material which acts primarily to prevent electrodeposition of high permeability magnetic material within these spaces. Two such three layered structures are then adjacently disposed so that the elongated slots therein are aligned and so that the bridging conductors are interlaced. The magnetic comb teeth are then formed by electrodepositing high permeability magnetic material in the spaces between horizontally adjacent sets of conductive signal lines.

Accordingly, it is an object of the present invention to provide a high density magnetic printing head which is readily fabricated from readily available components without the necessity of having to provide a separately insertable magnetic comb structure.

DETAILED DESCRIPTION OF THE INVENTION

Figure 1:
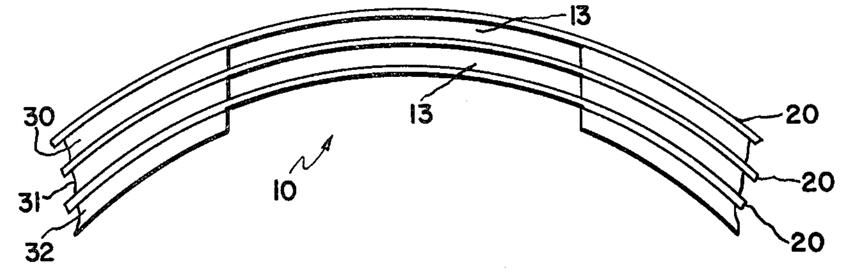
FIG. 1 is a partial cross-sectional side elevation view, of a portion of one of the printed board structures.

FIG. 1 illustrates one of preferably three layered structures employed in the present invention. In particular, FIG. 1 shows a portion of the structure in the region of the elongated gap. The structure shown comprises electrically conductive signal lines 20 disposed on separate flexible printed circuit boards 30, 31, and 32. The boards typically are composed of an insulative material such as Mylar®. Signal conductors 20 are disposed on substrates 30, 31, and 32 in a well-known conventional manner. However, a significant difference between the substrates shown in FIG. 1 and conventional substrates is that the conductors 20 bridge a gap in the circuit board. The elongated gap is easily provided by selectively removing a portion of the circuit board following conventional etching of the electrical conductors. Alternatively, the portion of the conductors which bridge the gap may be temporarily supported by a removable insert. In the present invention, the uppermost layer in FIG. 1, that is, substrate 30 and its associated conducting signal lines form a sacrifical layer which may later be removed by grinding. Substrate 31 preferably supports conductive signal lines configured as digit drive lines in accordance with the terminology employed in the above application Ser. No. 060,921. Substrate 32 supports signal conductors generally configured as word drive lines. While not visible in FIGS. 1 and 2, there are differences in the printed circuit patterns for the digit lines and for the word lines. These differences are more particularly shown in FIGS. 7 and 8 of aforementioned application Ser. No. 060,921. Variations of these patterns to accommodate different numbers of word and digit lines are easily accomplishable.

The triplex printed circuit board structure of FIG. 1 is formed by disposing a plurality of printed circuit boards adjacent one another so that the elongated gaps therein are in substantial alignment and so that the conductors bridging a gap in one circuit board are approximately parallel to and opposite conductive signal lines on adjacent circuit boards. The triplex printed circuit board structure of FIG. 1 is preferably constructed using an adhesive such as epoxy between the circuit boards to hold them in fixed relative position as seen in FIG. 1. Because of conventional etching methods employed to form printed circuit boards, the conductive signal lines generally have a rectangular cross section. The construction of the triplex structure shown in FIG. 1 results in vertical spaces between conductive signal lines on adjacent printed circuit boards. The vertical spaces are preferably filled with insulating material 13. This insulating material which may also comprise an epoxy is disposed in the vertical spaces between signal lines on adjacent substrates. However, this insulating material is not present in the horizontal spaces between signal lines on the same substrate. Insulating material 13 serves several functions. First, it provides a certain amount of support for the conductive portions bridging the elongated gap. Second, it provides additional insulation between the conductive signal lines. And lastly, and more importantly, the insulating material prevents electrodeposition (described more fully below) of high permeability magnetic material in the vertical spaces. Insulating material 13 is relatively easily positioned in vertical spaces between adjacent printed circuit boards by joining the printed circuit boards with an adhesive such as epoxy having a relatively slow curing time (for example, approximately three minutes). The epoxy adhesive is disposed between the printed circuit boards and fills all the regions between adjacent and opposed conductive signal lines. The epoxy is then blown out by means of a pressurized stream of gas, such as air, from between the adjacent pairs of conductive signal lines. The epoxy or other suitable adhesive is then permitted to harden to form the structure of FIG. 1. In this manner, the region between opposed pairs of conductive signal lines are filled with hardened epoxy or other adhesive which effectively prevents electrodeposition of magnetically permeable material between opposed pairs of signal lines while permitting electrodeposition between horizontally adjacent pairs of conductive windings, as more completely described below.

The triplex structure of FIG. 1 is generally identified by reference numeral 10. Two such structures are employed in the present invention to provide the desired high resolution.

Figure 2:
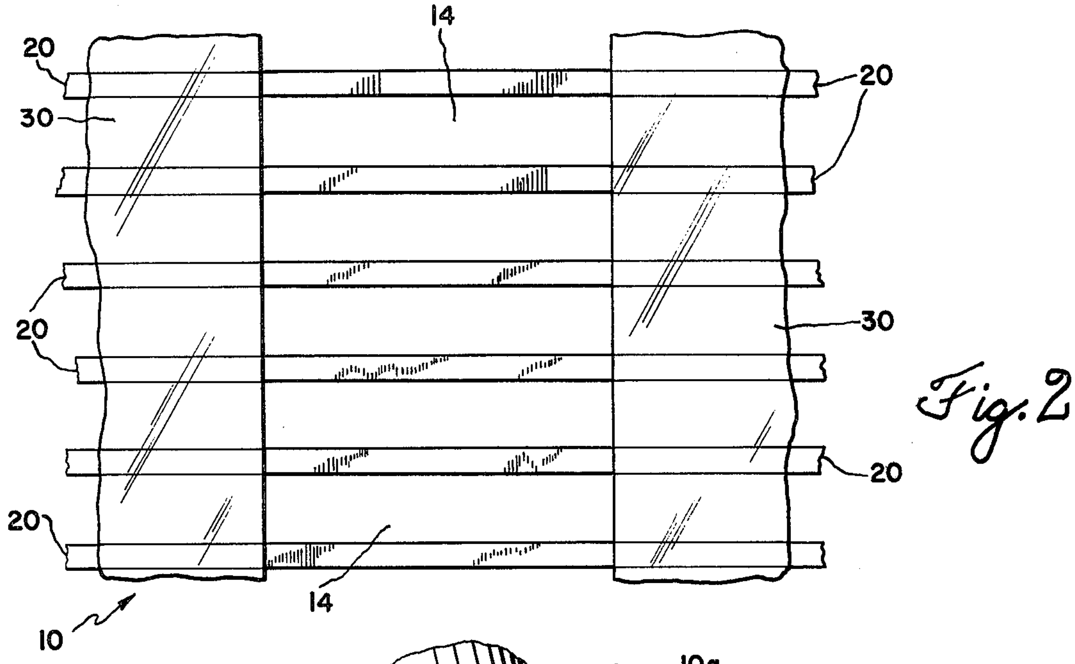
FIG. 2 is a top view of the structure shown in FIG. 1.
Figure 3:
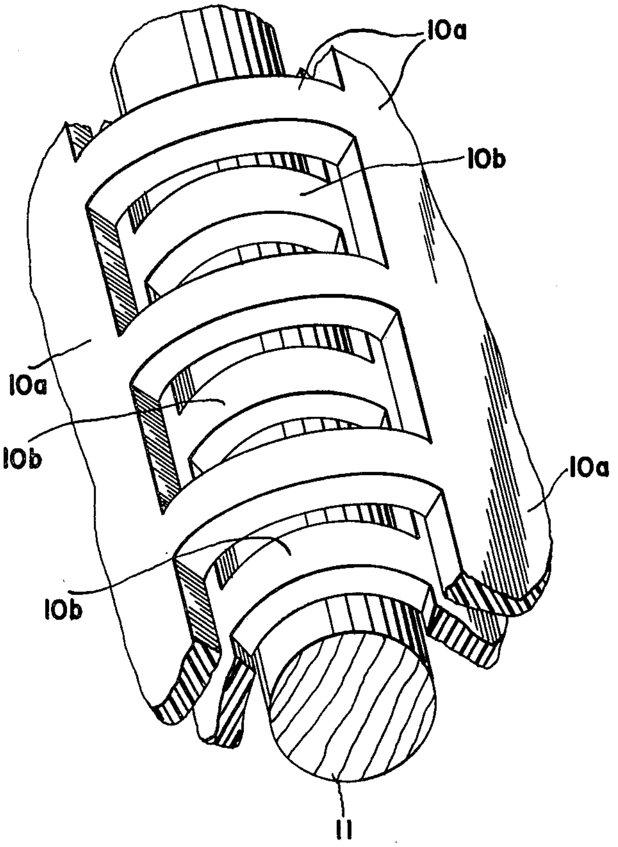
FIG. 3 is a perspective view illustrating the relative positioning of two of the printed board structures of FIG. 1 in a printing head of the present invention.

FIG. 2 shows a top view of the triplex structure shown in FIG. 1. Visible in FIG. 2 are electrically conductive signal lines 20 and the upper printed circuit board 30 associated therewith. Also seen in this view are horizontal spaces 14 between the signal lines on each individual circuit board. The bridging conductors of a second triplex structure are inserted into spaces 14 to double the print resolution. The insertion is best illustrated in FIG. 3 in which two triplex printed circuit board structures 10*a* and 10*b* are shown. Two identical triplex structures as shown in FIGS. 1 and 2 are employed in FIG. 3. For ease of description however, the individual layers of the triplex structures are not shown in FIG. 3. The printing head of the present invention may be fabricated from two such triplex structures by first disposing one such structure, such as 10_b_ over a nickel-iron plating cathode wire 11. Following that, a second triplex structure 10_a_ is disposed over the wire 11. For triplex structures 10_a_ and 10_b_, the plating wire is substantially parallel to the elongated gaps in each printed circuit board structure. The triplex printed circuit board structure 10_a_ is disposed so that its bridging conductive signal lines are interleaved with the bridging signal lines on triplex structure 10_b_. These triplex structures are preferably arched so that the central portions of the interleaved signal lines are approximately parallel. The dimensions of the signal lines 20 and the horizontal spaces 14 are selected so that said interleaving is readily accomplished and so that there is still space remaining between horizontally adjacent sets of signal lines. It is through these remaining spaces that high permeability magnetic material is electrodeposited. The electro-deposition may be accomplished using the apparatus and electrolyte described in application Ser. No. 040,586 which has already been incorporated herein by reference.

Following electrodeposition, the interleaved triplex structure is removed from the electroplating jig and supported on an arched supporting member composed, for example, of anodized aluminum so as to dispose the magnetically active portions of the recording head relatively closer to the recording medium. The resulting structure is then preferably coated with a hardenable epoxy along its arched surface. This surface is then ground smooth to the extent necessary to expose a uniform set of magnetic comb teeth formed by electrodeposition.

While the above invention has been described in terms of employing a triplex assembly in each of the printed circuit board structures 10, this structure is principally provided for the purpose of operating the head in a coincident current fashion. This mode of operation is desirable to minimize the number of external connections to the printed circuit boards. However, if the coincident current addressing method is not desired or needed, the triplex assembly of FIG. 1 may be reduced to a duplex or even or a single layer structure. However, these structures are not the preferred embodiments of the present invention.

From the above, it may be appreciated that the magnetic printing head structure of the present invention provides a doubling of the print resolution over prior art magnetic printing heads. The improvements in resolution are simply and inexpensively accomplished using duplicated structures. Additionally, the problems associated with the insertion of the separate high permeability magnetic comb structure are eliminated by using electrodeposition methods. Furthermore, the increase in resolution is provided without having to resort to printed circuit boards requiring 200 or more signal lines per inch bridging an elongated gap in the circuit board.

While the invention has been described with reference to particular embodiments and examples, other modifications and variations will occur to those skilled in the art in view of the above teachings. Accordingly, it should be understood that within the scope of the appended claims, the invention may be practiced otherwise than is specifically described.

The invention claimed is:

1. A high resolution magnetic printing head comprising:

a pair of printed circuit board structures, each of said circuit board structures having an elongated gap formed therein, and including a plurality of regularly spaced conductive signal lines, said signal lines being substantially parallel where they cross said elongated gap;

said circuit board structures being positioned so that said gaps are aligned and so that the conductive lines on at least one of the board structures are arched and disposed between the conductive lines on the other board structure such that a plurality of horizontal spaces are defined between adjacent conductive signal lines; and high permeability magnetic material electrodeposited in said horizontal spaces.

2. The magnetic printing head of claim 1 in which at least one of said printed circuit board structures comprises:

a first printed circuit board having a plurality of regularly spaced, conductive signal lines, said signal lines being substantially parallel where they cross an elongated gap in said first printed circuit board;

a second printed circuit board having a plurality of regularly spaced, conductive signal lines, said signal lines being substantially parallel where they cross an elongated gap in said second printed circuit board;

a third printed circuit board having a plurality of regularly spaced, conductive signal lines, said signal lines being substantially parallel where they cross an elongated gap in said third printed circuit board;

said first, second, and third printed circuit boards being positioned one atop the other so that said elongated gaps are aligned and so that said signal lines on each printed circuit board are substantially parallel to and opposite signal lines on an adjacent printed circuit board where said signal lines cross said elongated gap.

3. The magnetic printing head of claim 2 in which an insulative material is disposed in vertical spaces between conductive signal lines on said first, second, and third printed circuit boards.

4. The magnetic printer head of claim 3 wherein said insulative material comprises a slow curing epoxy adhesive employed to join said first, second, and third printed circuit boards to form said printed circuit board structure.

5. The magnetic printing head of claim 4 wherein at least one of said first, second, and third printed circuit boards comprises a flexible printed circuit board.

6. The magnetic printing head of claim 2 or claim 5 wherein the uppermost of said first, second, and third printed circuit boards and the respective conductive signal lines associated therewith comprises a sacrificial printed circuit board.

* * * * *